US010037265B2

(12) United States Patent
Bates et al.

(10) Patent No.: US 10,037,265 B2
(45) **Date of Patent: *Jul. 31, 2018**

(54) ENHANCING THE DEBUGGER STACK WITH RECENTLY REPORTED ERRORS UNDER DEBUG

(71) Applicant: International Business Machines Corporation, Armonk, NY (US)

(72) Inventors: Cary L. Bates, Rochester, MN (US); Lee Helgeson, Rochester, MN (US); Justin K. King, Rochester, MN (US); Michelle A. Schlicht, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 22 days.

This patent is subject to a terminal disclaimer.

(21) Appl. No.: 14/818,181

(22) Filed: Aug. 4, 2015

(65) Prior Publication Data

US 2017/0039131 A1 Feb. 9, 2017

(51) Int. Cl.
*G06F 9/44* (2018.01)
*G06F 11/36* (2006.01)
*G06F 9/445* (2018.01)

(52) U.S. Cl.
CPC ...... *G06F 11/3688* (2013.01); *G06F 9/44505* (2013.01)

(58) Field of Classification Search
CPC . G06F 11/3664; G06F 11/362; G06F 11/3644
See application file for complete search history.

(56) References Cited

U.S. PATENT DOCUMENTS

| | | | | |
|---|---|---|---|---|
| 6,085,029 | A * | 7/2000 | Kolawa | G06F 11/3624 714/38.13 |
| 8,719,791 | B1 * | 5/2014 | MacPherson | G06F 9/4426 717/104 |
| 8,789,023 | B2 * | 7/2014 | Lindahl | G06F 11/3636 717/129 |
| 9,542,300 | B1 * | 1/2017 | Massicotte | G06F 11/362 |
| 2004/0054991 | A1 * | 3/2004 | Harres | G06F 11/3664 717/131 |
| 2005/0028145 | A1 | 2/2005 | Kang et al. | |
| 2005/0071820 | A1 * | 3/2005 | Srinivas | G06F 11/3644 717/129 |

(Continued)

OTHER PUBLICATIONS

International Business Machines Corporation, "List of IBM Patents or Patent Applications Treated as Related," Aug. 26, 2015, 2 pages.

*Primary Examiner* — Wei Zhen
*Assistant Examiner* — Brahim Bourzik
(74) *Attorney, Agent, or Firm* — Patterson + Sheridan, LLP

(57) ABSTRACT

Method and apparatus for enhancing an executable is disclosed herein. In one embodiment, the method includes instrumenting an executable with additional program code to detect run-time errors, and while running the instrumented executable within a debug environment generating the run-time errors detected by the additional program code, upon reaching a breakpoint, identifying any of the run-time errors which occurred while executing a function in which the breakpoint is located, and transmitting an indication of the identified run-time errors to the debugging environment.

11 Claims, 9 Drawing Sheets

(56) References Cited

U.S. PATENT DOCUMENTS

| | | | | |
|---|---|---|---|---|
| 2008/0127119 | A1* | 5/2008 | Kasman | G06F 11/366 717/130 |
| 2008/0256519 | A1 | 10/2008 | Shen | |
| 2009/0100413 | A1 | 4/2009 | Nash | |
| 2011/0107307 | A1 | 5/2011 | Liu et al. | |
| 2013/0074045 | A1 | 3/2013 | Bates | |

* cited by examiner

ENHANCING THE DEBUGGER STACK WITH RECENTLY REPORTED ERRORS UNDER DEBUG

BACKGROUND

The present invention relates to debugging an executable at runtime to provide additional data to a debugger and a dynamic analysis tool, and more specifically, to generating dynamic analysis errors in an executable in the context of a debugger.

An issue in developing software is that the quality of code is dependent on many factors, such as the skill level of the developers, the quality of testing, and the sufficient time to test every path of code. In today's competitive market, the time to design, generate, and test code is constantly shrinking, while the time to fix problems within the code is becoming increasingly more critical. There is a need to provide better tools for developers to help speed the diagnostic process and help developers become more proactive at looking for potential problem areas before issues arise in the field.

Dynamic analysis tools, such as PurifyPlus™, available from UNICOM Systems, Inc., provide a toolset that improves the reliability of software applications by identifying difficult to find memory errors, such as uninitialized memory access, buffer overflow, and improper freeing of memory. A limitation of dynamic analysis tools, however, is when the dynamic analysis tools are used on existing executables for the first time. In such cases, the dynamic analysis tools may detect numerous errors that have been in the code for a long time. Depending on the size of the code, and the number of revisions, versions, or related systems, the dynamic analysis tool may detect hundreds, if not thousands, of issues. Many of the errors identified by the dynamic analysis tools may be harmless or very unlikely to disrupt overall program operation or result in incorrect computing results, and thus, may not worth the time to fix. In any case, the sheer number of errors can overwhelm a developer. More importantly, the sheer number of errors can make it very difficult for a developer to determine which errors are related to the particular problem the developer is trying to fix address, especially when the developer is under pressure to fix the problem quickly.

SUMMARY

According to one embodiment of the present invention, a method for enhancing debugging of an executable is disclosed herein. The method includes instrumenting an executable with additional program code to detect run-time errors, and while running the instrumented executable within a debug environment generating the run-time errors detected by the additional program code, upon reaching a breakpoint, identifying any of the run-time errors which occurred while executing a function in which the breakpoint is located, and transmitting an indication of the identified run-time errors to the debugging environment.

According to one embodiment of the present invention, a system is disclosed herein. The system includes a processor and a memory storing program code, which, when executed on the processor, performs an operation of enhancing the debugging of an executable. The operation includes instrumenting an executable with additional program code to detect run-time errors, and while running the instrumented executable within a debug environment generating the run-time errors detected by the additional program code, upon reaching a breakpoint, identifying any of the run-time errors which occurred while executing a function in which the breakpoint is located, and transmitting an indication of the identified run-time errors to the debugging environment.

According to one embodiment of the present invention, a computer program product for enhancing debugging of an executable is disclosed herein. The computer program product includes a computer-readable storage medium having computer-readable program code embodied therewith. The computer-readable program code includes computer-readable program code configured to instrument an executable with additional program code to detect run-time errors and while running the instrumented executable within a debug environment, computer-readable program code configured to generate the run-time errors detected by the additional program code, computer-readable program code configured to identify any of the run-time errors which occurred while executing a function in which a breakpoint is located upon reaching the breakpoint, and computer-readable program code configured to transmit an indication of the identified run-time errors to the debugging environment.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be referenced by embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

Figure 1:
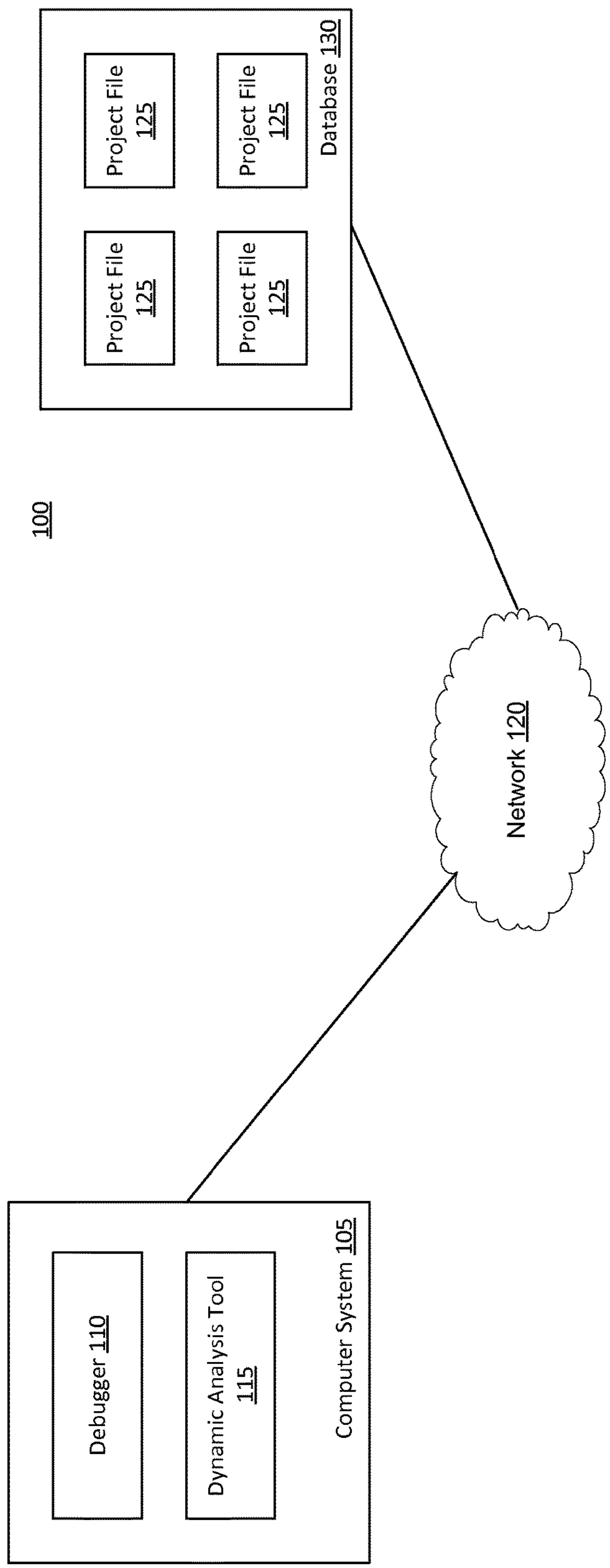
FIG. 1 illustrates a computing environment, according to one embodiment disclosed herein.

Embodiments presented herein describe techniques for enhancing the debugging of an executable using dynamic analysis tool and a debugger. In one embodiment, the dynamic analysis tool instruments an executable with additional program code to obtain information about the executable at run-time. The instrumented executable is then run in a debug environment. A debugger presents the errors detected by the instrumented code in context of a given debug session state.

In one embodiment, the dynamic analysis tool instruments the executable with additional executable code that detects certain run-time errors when the instrumented code is executed. The dynamic analysis tool may have dynamic analysis parameters set before the analysis begins. For example, the dynamic analysis tool may be configured to detect only certain errors, such as memory leaks. Breakpoints may be set so that the developer can halt the executable at certain points during the analysis. The dynamic analysis tool instruments the executable with additional executable code to detect errors in the executable.

In one embodiment, the debugger provides the run-time errors generated during run-time in the context of a debug environment. The debugger may have parameters set before debugging of the instrumented executable begins. For example, the debugger may only provide certain dynamic analysis errors in the context of a debug environment. The debugger selects an instrumented executable for debugging. The developer may set breakpoints within the code to halt execution of the program at specified locations. For example, the developer may want to set breakpoints after a certain call sequence in the instrumented executable. The instrumented executable is then executed in the debug environment. In one embodiment, debugging of the executable may include advanced data flow analysis to provide a more detailed analysis of the run-time errors.

While the current level of integration between dynamic analysis tools and a debugger is helpful, it does not adequately help the user determine which errors detected by the dynamic analysis tool are related to a particular issue. Embodiments presented herein provide techniques for better integrating a dynamic analysis tool and a debugger. More specifically, embodiments presented herein integrate certain capabilities of the dynamic analysis tool with a debugger to assist developers in identifying specific issues that may be causing the problem they are trying to debug.

The disclosure tracks issues by instrumenting debuggable code with a dynamic analysis tool. Once a program under test (PUT) is instrumented, the debugger will detect errors in the PUT at execution. For this disclosure, errors occurring within a particular function and stack frame are tracked and associated with that routine and stack frame. When an error is detected, the stack display in a debugging interface is updated to show the developer what calling routines had problems detected by the instrumented code, prior to execution reaching the current breakpoint. Doing so allows developers to quickly determine what errors detected by the instrumentation may be related to the problem they are seeing.

FIG. 1 illustrates an example computing environment 100, according to one embodiment. For example, the computing environment 100 includes a computing system 105, a network 120, and a database 130 storing project files 125. Illustratively, the computing system 105 includes a debugger 110 and a dynamic analysis tool 115.

The dynamic analysis tool 115 is an application generally configured to instrument executables, such as one of the project file 125 in database 130. The dynamic analysis tool 115 provides a toolset that improves the reliability of executables by identifying difficult to find memory errors, such as uninitialized memory access, buffer overflow, and improper freeing of memory. To do so, the analysis tool 115 instruments an executable program with additional code that, while generally transparent to the operations of the executable, detects and reports on certain errors or problems identified at runtime. The dynamic analysis tool 115 may be used while building an executable or on an existing executable.

The debugger 110 is an application generally configured to test and/or debug other executables, such as one of the project files 125 in database 130. The debugger 110 allows the developer to diagnose and correct problems that occur during runtime. For example, a developer can use the debugger 110 to insert breakpoints at locations in a program where the program crashes or where the program does not produce the correct results.

In the computing environment 100, the dynamic analysis tool 115 works with the debugger 110 to assist developers in zeroing in on potential issues that may be causing a problem the developer is trying to debug. To do this, the dynamic analysis tool 115 instruments the executable with additional executable code to detect errors at runtime. The debugger 110 will provide the errors found by the instrumented code in the context of a debug environment.

Figure 2:
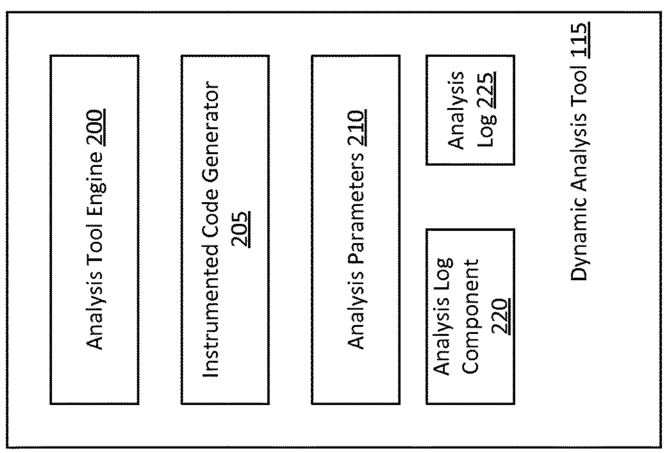
FIG. 2 illustrates a dynamic analysis tool, according to one embodiment disclosed herein.

FIG. 2 illustrates the dynamic analysis tool 115, according to one embodiment. As shown, the dynamic analysis tool 115 includes an analysis tool engine 200, an instrumented code generator 205, analysis parameters 210, an analysis log component 220, and an analysis log 225. The instrumented code generator 205 instruments the executable with code to detect memory leaks, uninitialized memory access, or line-level and function level code coverage. At run-time, the instrumented code in the executable may report this to the analysis tool engine 200. The analysis parameters 210 allow the user to customize the instrumented code generator 205 such that the additional program code detects only desired errors. For example, the analysis parameters 210 may be set such that the additional program code detects only memory leaks. The analysis log component 220 records errors detected at runtime in the analysis log 225.

Figure 3:
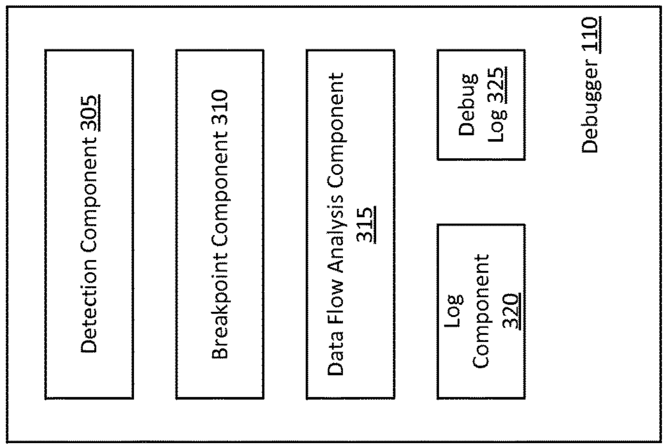
FIG. 3 illustrates a debugger, according to one embodiment disclosed herein.

FIG. 3 illustrates the debugger 110, according to one embodiment. As shown, the debugger 110 includes a detection component 305, a breakpoint component 310, a data flow analysis component 315, a log component 320, and a debug log 325. The detection component 305 reports information on errors detected by the instrumented code in the context of the debugging environment. The log component 320 records the errors detected in an executable in the debug log 325 for the currently executing routine at a current stack frame. For example, a record containing an address associated with the error may be updated. The record provides this information to the debugger so that the debugger may display this information. The breakpoint component 310 allows the user to set breakpoints for the detection component 305. For example, the user may want to set a breakpoint before, during, or after a specific routine or specific stack frame. When the PUT halts execution at a breakpoint, the debugger can present information related to errors identified by the instrumented code and the dynamic analysis tool. For example, in one embodiment, the debugger presents any error detected in the executing routine of the breakpoint. Further, a developer can browse routines on the program stack to identify errors detected in the PUT in routines executed prior to the current one. The data flow analysis component 315 works with the detection component 305 to provide a more detailed analysis of an error detected.

Figure 4:
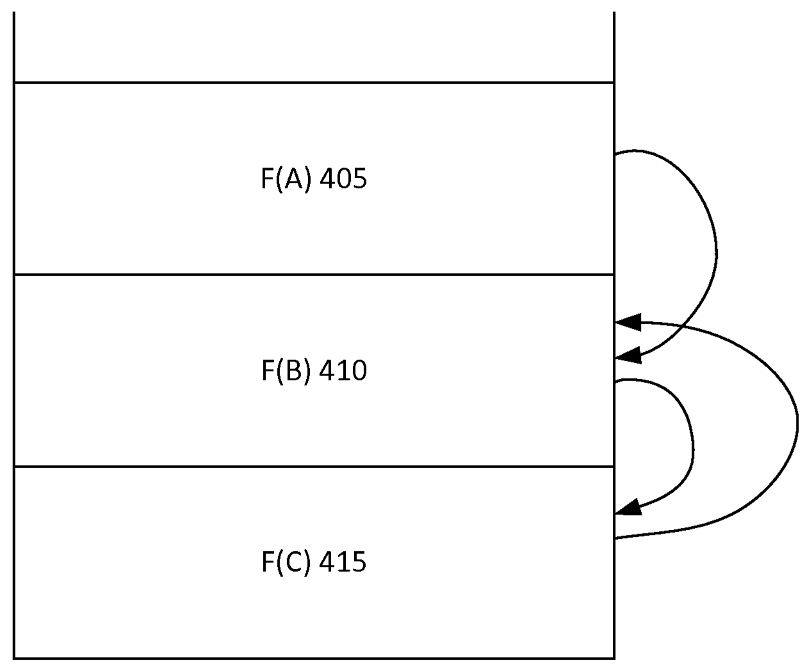
FIG. 4 illustrates a stack frame, according to one embodiment disclosed herein.

Referring to FIG. 4, FIG. 4 illustrates an example stack 400 in an instrumented executable under analysis in the debugger 110. As shown, stack 400 includes frames calls to function F(A) 405, function F(B) 410, and function F(C) 415. F(A) 405, F(B) 410, and F(C) 415 include dynamic analysis errors found by the analysis tool engine 200 that occurred while executing the instrumented executable. In this example, F(A) 405 calls F(B) 410; F(B) 410 calls F(C) 415; and F(C) 415 returns to F(B) 410 without hitting a breakpoint. Because F(C) 415 returns to F(B) 410, F(C)'s 415 entry was popped off the stack, and all records for F(C) 415 are discarded. Thus, when the user looks into the debug log 325 to see the errors associated with the frame stack 400, the user will not see the errors associated with F(C) 415. This is problematic because the error associated with F(C) 415 may have caused the errors associated with F(A) 405 and F(B) 410, respectively. The data flow analysis component 315 can fix this issue by keeping track of those variables or functions that may affect later computation in the current stack. Thus, using data flow analysis component 315 in conjunction with the detection component 305 can detect more complex errors that are written to the records associated with the runtime routine in a stack.

Figure 5:
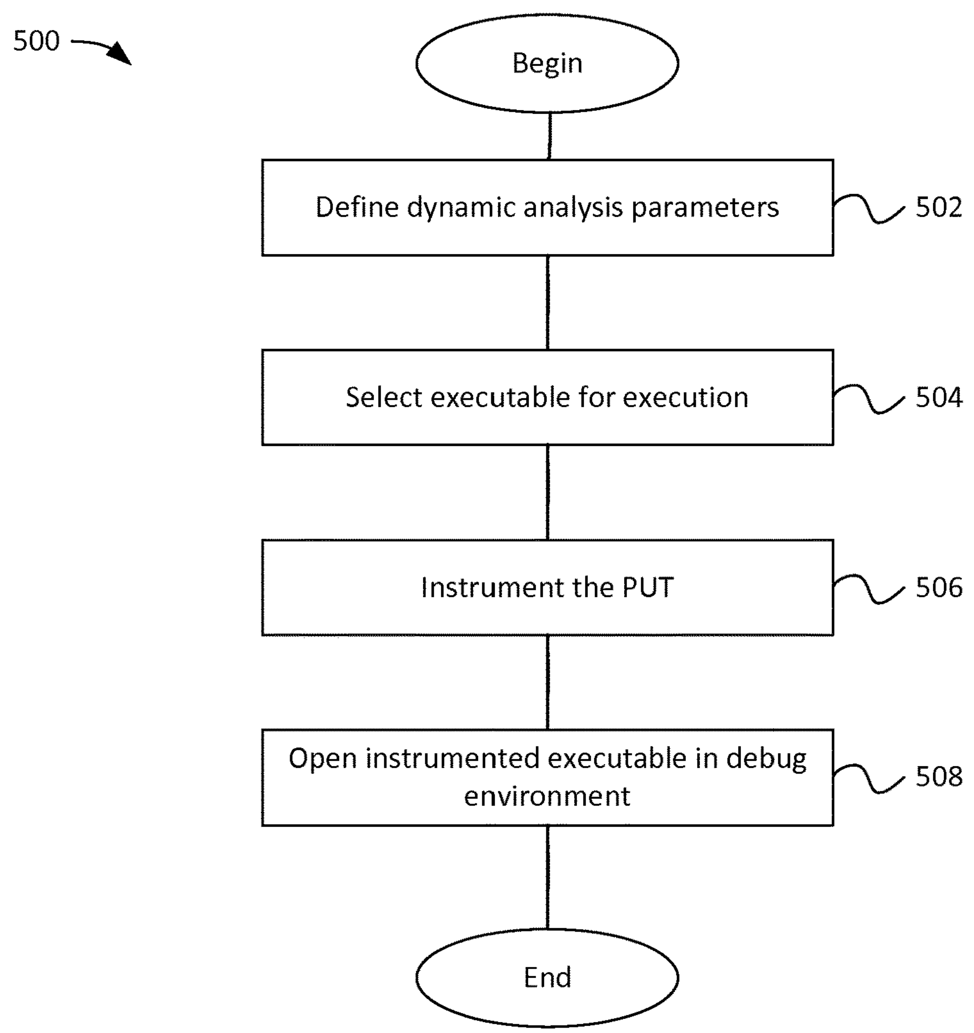
FIG. 5 illustrates a method for using the dynamic analysis tool, according to one embodiment disclosed herein.

FIG. 5 illustrates a method 500 for using the dynamic analysis tool 115, according to one embodiment. The method 500 begins at step 502 where the analysis parameters 210 are defined. As noted, the analysis parameters specify a scope of errors the instrumented executable should generate at runtime. At step 504, an executable is selected for analysis. At step 506, the instrumented code generator 205 instruments the selected executable, i.e., the program under test (PUT) with additional program code to detect the errors specified in the analysis parameters at step 502. The additional program code in the executable identifies errors present in the executable. At step 508, the instrumented executable, i.e. PUT, is opened in a debugging environment for execution.

Figure 6:
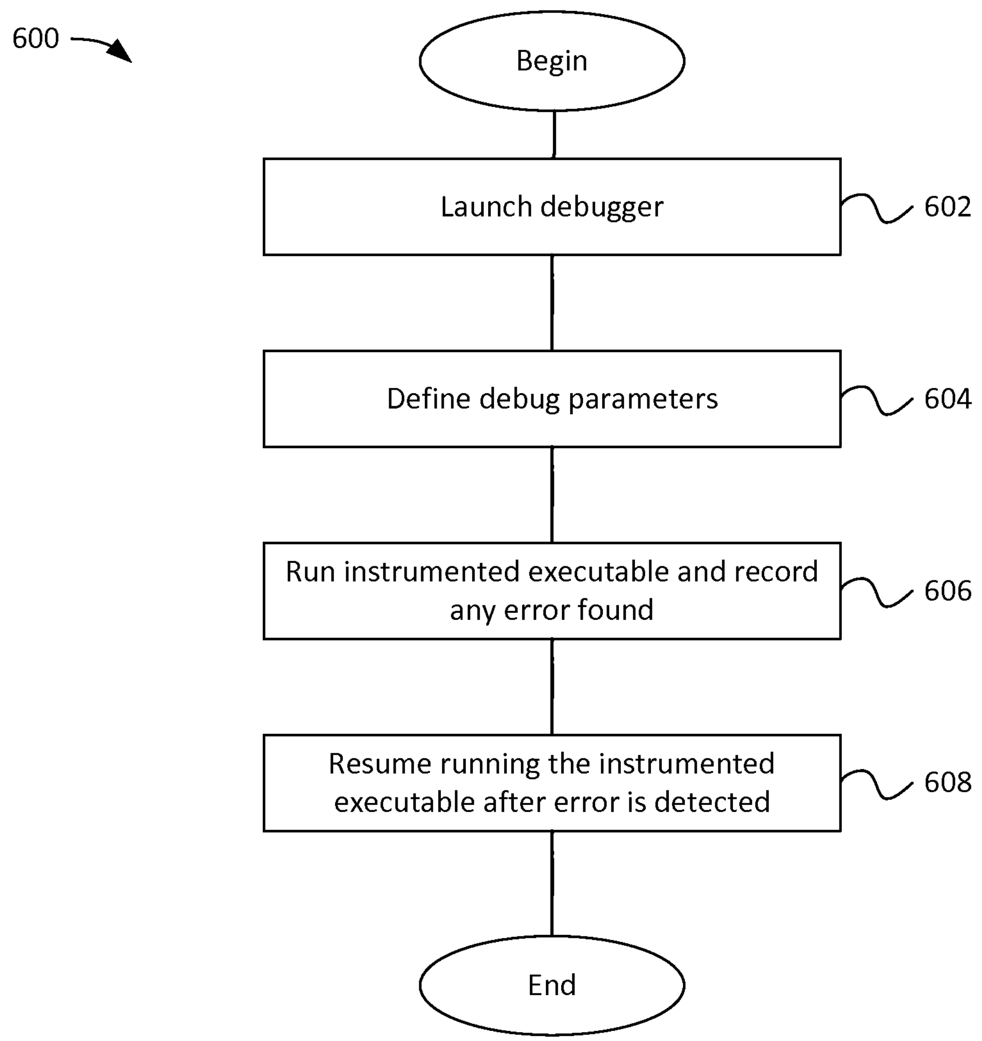
FIG. 6 illustrates a method for debugging an executable, according to one embodiment disclosed herein.

FIG. 6 illustrates a block diagram of a method 600 for debugging an executable instrumented to detect certain dynamic run time errors, according to one embodiment. At step 602 the debugger 110 is launched. At step 604, the debug parameters are defined in the debugger 110. For example, a developer may use the breakpoint component 310 provided by the debugger to specify breakpoints at which the execution of the instrumented executable should be halted. Such breakpoints can be unconditional or depend on a set of conditions (e.g., halt on reaching an instruction if a given variable has a specified value). At step 606, the instrumented executable runs in the debugger. The debugger will provide, among other things, the dynamic analysis errors detected by the additional program code in the context of the debugger. As the instrumented executable runs in the debugger, if the detection component 305 detects an error in the instrumented executable, the record for the currently executing routine in the instrumented executable is updated to save the error and any address that may have been associated with the error. At step 608, the instrumented executable resumes running, and execution continues as normal. When a routine returns, instrumentation code at the return point gets control, and frees up the record for this routine and stack frame. Whenever the stack display is updated, the list of routines and stack frames are accessed. For each entry on the stack, the user can access the list and determine if any errors have been detected by the instrumentation code for that stack entity. If so, the entry is highlighted. Each of the errors detected is associated with the stack entry. If the user sees a highlighted stack entry, the user can right click and get a list of errors that occurred in that stack entry. The errors appear in the order that they occurred. The user can navigate to the error location by clicking on one of the errors.

Figure 7:
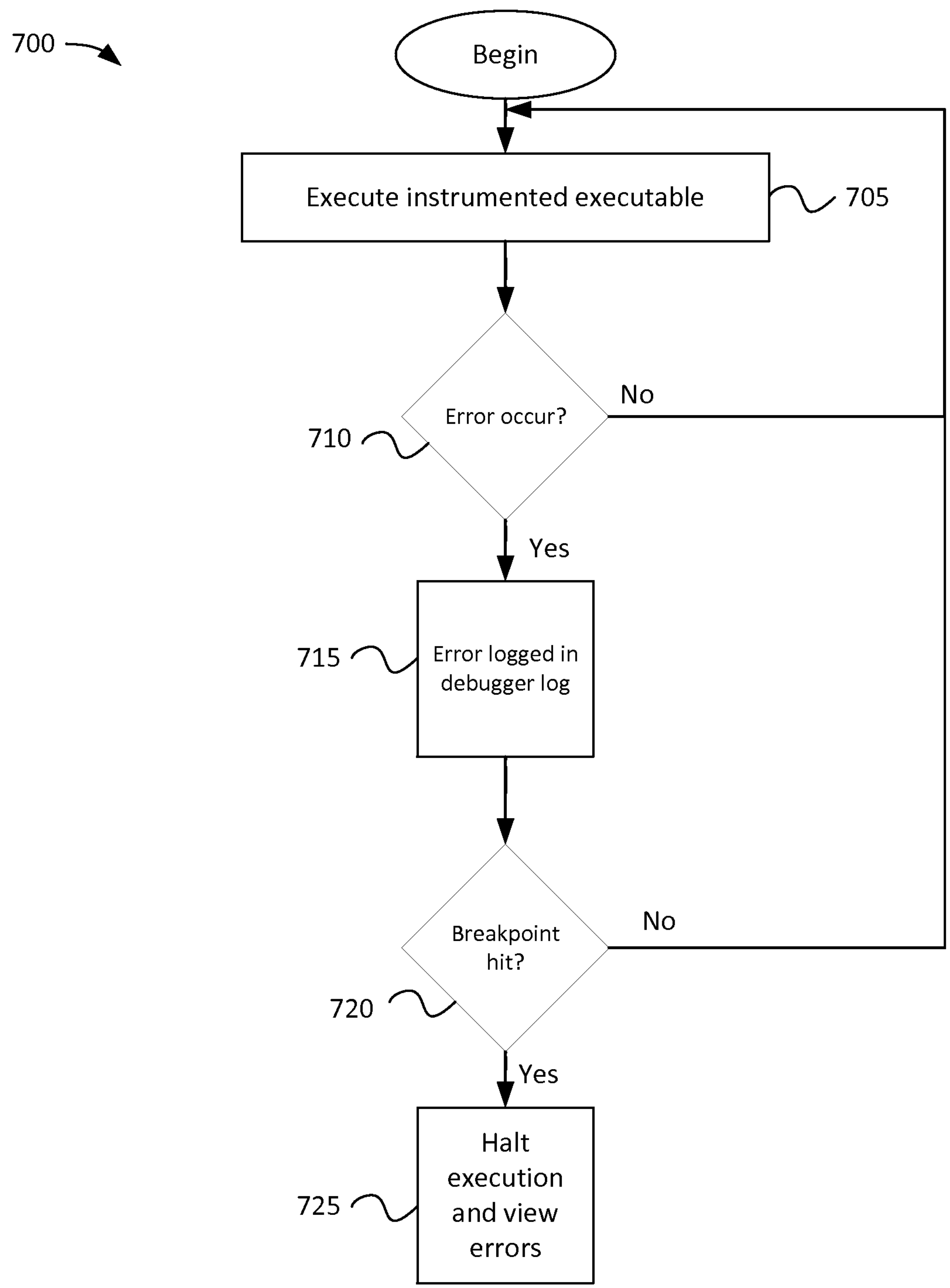
FIG. 7 illustrates a method for debugging an instrumented executable, according to one embodiment disclosed herein.

FIG. 7 illustrates a block diagram of a method 700 for debugging the instrumented executable, according to one embodiment. The method 700 begins at step 705 when the instrumented executable is executed. At decision block 710, the debugger determines whether an error generated by the instrumented code occurred. If an error occurred, at step 715 a record of the error is created. The log component 320 updates the debug log 325 with that error. The error is tied back to the stack frame of the routine that was being executed when the error occurred. At decision block 720, it is determined whether a breakpoint was hit. If a breakpoint was hit, at block 725 execution is halted, and the developer can view the error and any errors for the routines within the stack frame that were executed. The error may be, for example, a dynamic analysis error associated with the current routine. If, however, a breakpoint was not hit, the method reverts back to step 702, and the instrumented executable is executed until a breakpoint is hit.

Figure 8:
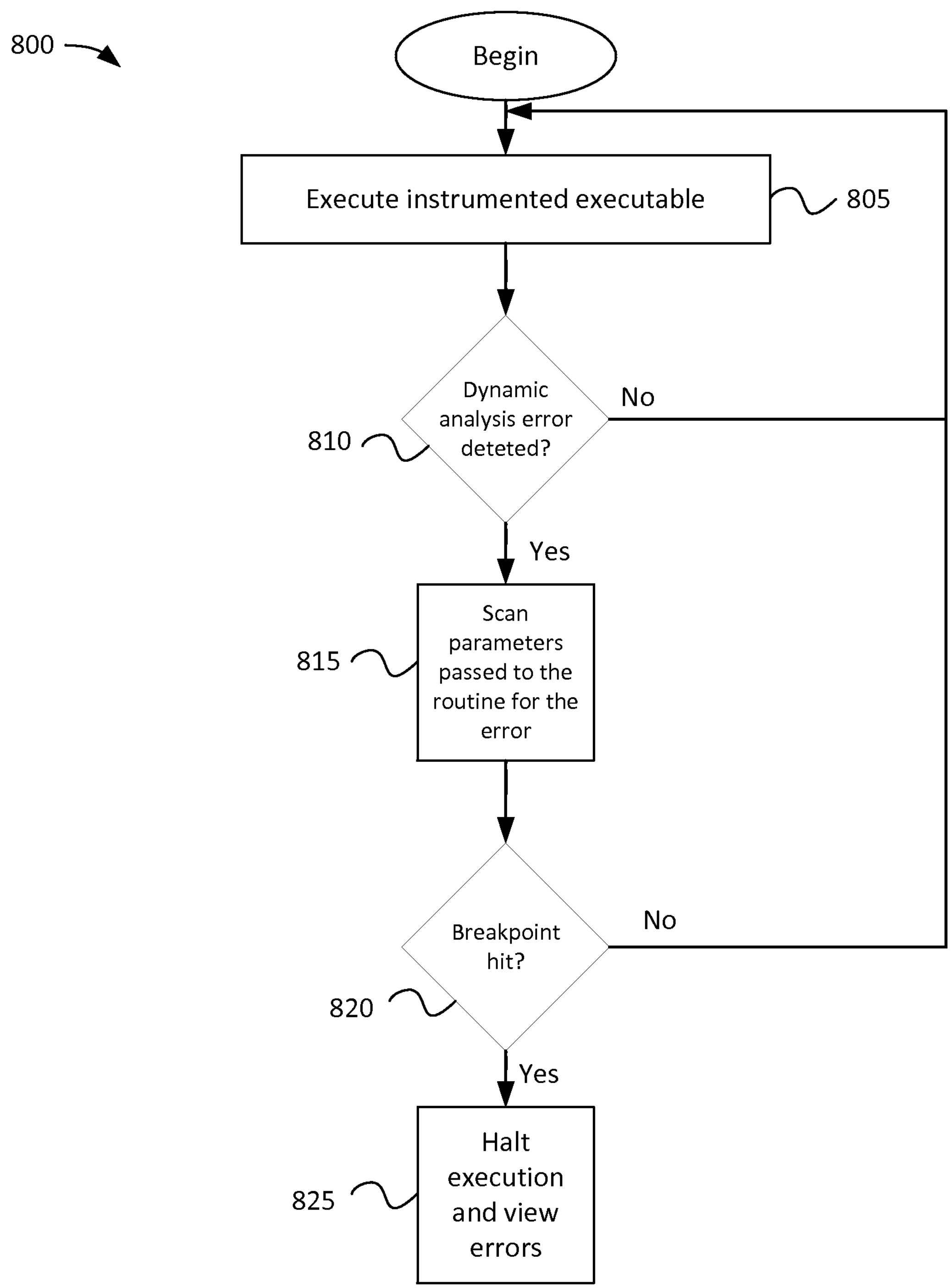
FIG. 8 illustrates a method for debugging an instrumented executable, according to another embodiment disclosed herein.

FIG. 8 illustrates a method 800 for debugging instrumented code using simple data flow analysis, according to one embodiment. The method 800 begins at step 805 when the instrumented executable is executed. At decision block 810, the processor determines whether the debugger detects a dynamic analysis error generated by the instrumented code. If the debugger detects a dynamic analysis error, at step 815, the data flow analysis component 315 scans the parameters passed to the routine for the error. At decision block 820, the detection component 305 determines whether a breakpoint set by the breakpoint component 310 was hit. If a break point was hit, at step 825, execution is halted and the developer can view the error and any other errors for the routines within the stack frame that were executed. The error may be, for example, a dynamic analysis error associated with the current routine. If a break point was not hit, the method reverts to step 805, and execution continues until a break point is hit.

Figure 9:
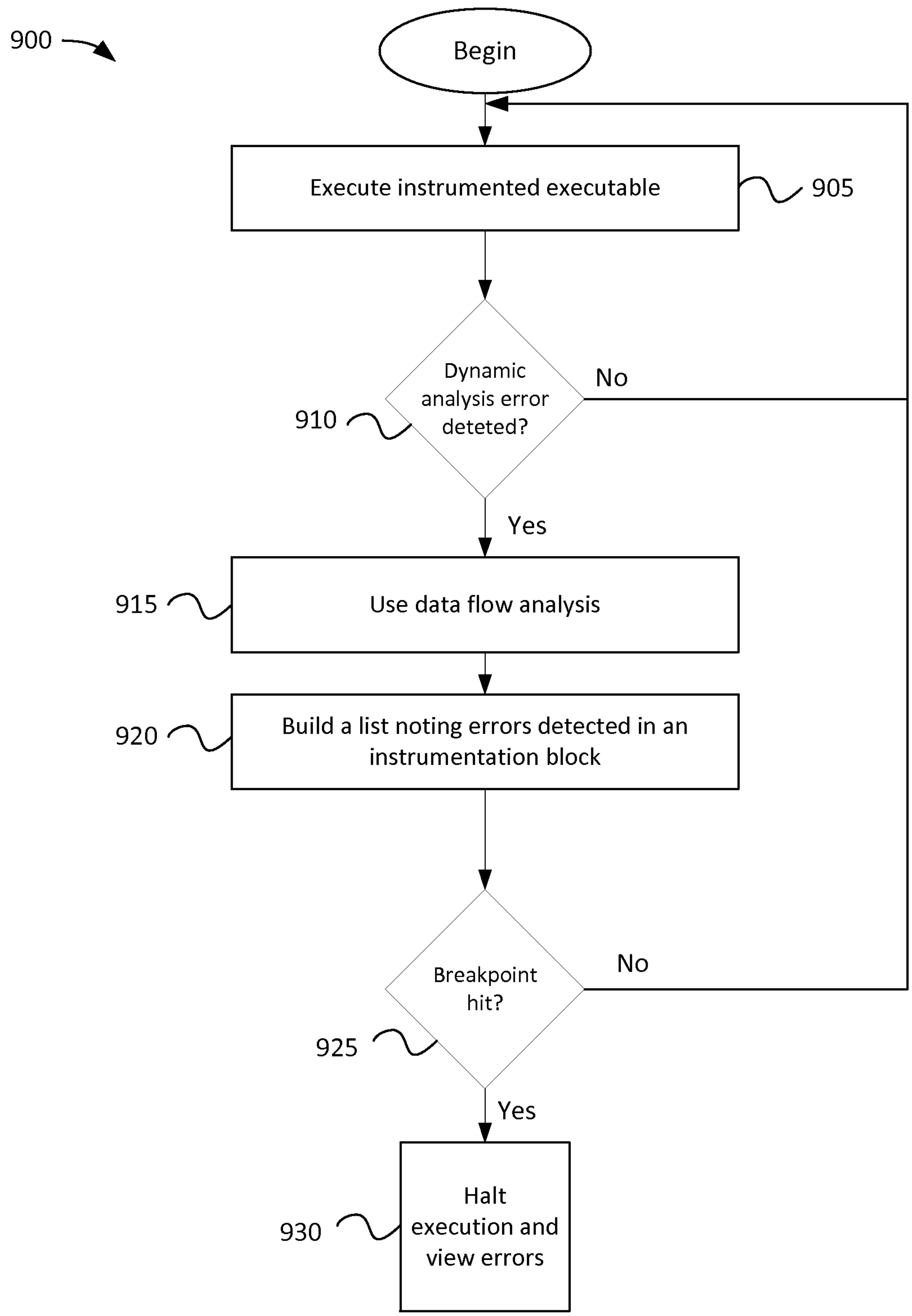
FIG. 9 illustrates a method for debugging an instrument executable, according to yet another embodiment disclosed herein.

FIG. 9 illustrates another method 900 for debugging the instrumented code using a dynamic flow analysis, according to one embodiment. The method 900 begins at step 905 when the instrumented executable is executed. At decision block 910, the processor determines whether the debugger detects a dynamic analysis error generated by the instrumented code. If the debugger detects a dynamic analysis error, at step 915 the data flow analysis component 315 uses data flow analysis on the detected errors. At step 920, the data flow analysis component 315 builds a list noting the errors detected in a stack frame. The log component 320 updates the debug log 325 with that error. The error is tied back to the stack from the routine that was being executed when the error was hit. At decision block 925, the detection component 305 determines whether a break point was hit. If a break point was hit, at step 930, execution is halted and the developer can view the error and any other errors for the routines within the stack frame that were executed. The error may be, for example, a dynamic analysis error associated with the current routine. If the break point was not hit, however, the method reverts to step 905 and execution continues until a break point is hit.

Figure 10:
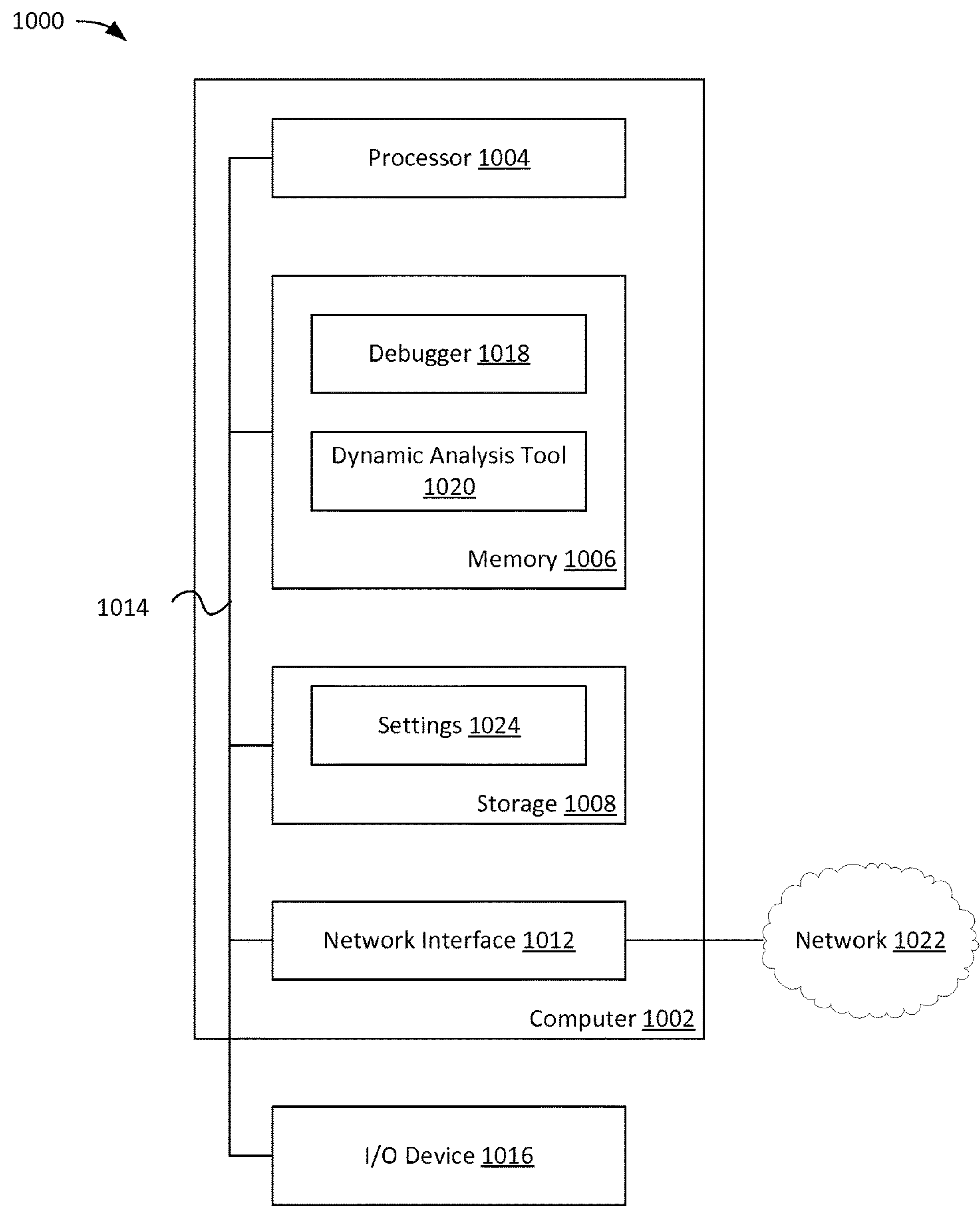
FIG. 10 illustrates a computing system, according to one embodiment disclosed herein.

FIG. 10 illustrates an example computing system 1000, according to one embodiment. As shown, the computing system 1000 includes a computer 1002 having a central processing unit (CPU) 1004, a memory 1006, storage 1008, and a network interface 1012, each connected to a bus 1014. The computing system 1000 also includes an I/O device 1016 (e.g., keyboard and mouse devices) connected to the computing system 1000. Further, in context of this disclosure, the computing elements shown in the computing system 1000 may correspond to a physical computing system (e.g., a system in a date center) or may be a virtual computing instance when executing within a computing cloud.

The CPU 1004 retrieves and executes programming instructions stored in the memory 1006 as well as stores and retrieves application data residing in the memory 1006. The bus 1014 is used to transmit programming instructions and application data between the CPU 1004, memory 1006, storage 1008, network interface 1012, and I/O device 1016. Note, CPU 1004 is included to be representative of a single CPU, multiple CPUs, a single CPU having multiple processing cores, and the like. The memory 1006 is generally included to be representative of a random access memory. The storage 1008 may be a disk drive storage device. Although shown as a single unit, the storage 1008 may be a combination of a fixed and/or removable storage devices, such as fixed disc drives, removable memory cards, optical storage, network attached storage (NAS), or storage-area-network (SAN). The storage 1008 may include settings 1024. The network interface 1012 may be any type of network communications allowing the computer 1002 to communicate with other computers via the network 1022.

The memory 1006 further includes a debugger 1018 and a dynamic analysis tool 1020. The debugger 1018 is an application generally configured to test and/or debug other executables. The debugger 1018 allows the developer to pinpoint anomalies that occur during runtime. For example, the debugger 110 can insert breakpoints at instances where a given processing element crashes, sends data to an unintended target processing element, etc.

The dynamic analysis tool 1020 is an application generally configured to test executables. The dynamic analysis tool 1020 provides a toolset that improves the reliability of executables by identifying difficult to find memory errors, such as uninitialized memory access, buffer overflow, and improper freeing of memory. An example of a dynamic analysis tool 1020 is PurifyPlus™ offered by UNICOM. The dynamic analysis tool 1020 may be used in runtime or on an existing executable.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., debugger or dynamic analysis tool) or related data available in the cloud. For example, the debugger and dynamic analysis tool could execute on a computing system in the cloud, detect runtime errors, and provide those errors in a runtime environment in the cloud. In such a case, the dynamic analysis tool could instrument an existing executable with additional program code to detect dynamic analysis errors and store the instrumented executable in the cloud so that the instrumented executable can later be run in a debug environment provide the runtime errors in the context of a debug environment location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:

a processor; and a memory storing program code, which, when executed on the processor, performs an operation of enhancing debugging of an executable, the operation comprising:

instrumenting the executable with additional program code to detect a plurality of predefined run-time errors defined by a plurality of analysis parameters; and while running the instrumented executable within a debug environment:

generating the plurality of predefined run-time errors comprising a first predefined run-time error and a second predefined run-time error detected by the additional program code;

generating a record of the first predefined run-time error, the record associating the first predefined run-time error with a stack frame of a first function that was being executed when the first predefined run-time error occurred, wherein the first function was invoked by a second function associated with the second predefined run-time error;

upon reaching a breakpoint in the second function, identifying any of the predefined run-time errors which occurred while executing the second function, wherein the stack frame of the first function is removed from the stack prior to reaching the breakpoint;

transmitting the record of the first predefined run-time error to the debugging environment; and outputting an indication of the record of the first predefined run-time error for display within the debug environment.

2. The system of claim 1, the operation further comprising:

creating a log;

responsive to the first predefined run-time error of the plurality of predefined run-time errors occurring, updating a record of the first predefined run-time error in the log; and continuing to run the instrumented executable until the breakpoint is hit.

3. The system of claim 1, the operation further comprising:

scanning parameters passed to a routine in the instrumented executable to detect the first predefined run-time error.

4. The system of claim 1, the operation further comprising:

using data flow analysis to detect the plurality of predefined run-time errors defined by the plurality of analysis parameters in the instrumented executable by associating each detected predefined run-time error with a respective record in a debug log, wherein each record associates the detected predefined run-time error with a respective stack frame of a respective routine being executed when the respective predefined run-time error is detected.

5. The system of claim 1, wherein a dynamic analysis tool instruments the executable with the additional executable program code to obtain program information about the executable.

6. The system of claim 1, the operation further comprising:

defining the plurality of analysis parameters for the executable.

7. A computer program product for enhancing debugging of an executable, the computer program product comprising:

a computer-readable storage medium having computer-readable program code embodied therewith, the computer-readable program code executable by a processor to perform an operation comprising:

instrumenting the executable with additional executable program code to detect the plurality of predefined run-time errors defined by the plurality of analysis parameters; and while running the instrumented executable within a debug environment:

generating the plurality of predefined run-time errors comprising a first predefined run-time error and a second predefined run-time error detected by the additional program code;

generating a record of the first predefined run-time error, the record associating the first predefined run-time error with a stack frame of a first function that was being executed when the first predefined run-time error occurred, wherein the first function was invoked by a second function associated with the second predefined run-time error;

identifying any of the predefined run-time errors which occurred while executing the second function in which a breakpoint is located upon reaching the breakpoint, wherein the stack frame of the first function is removed from the stack prior to reaching the breakpoint;

transmitting the record of the first predefined run-time error to the debugging environment; and outputting an indication of the record of the first predefined run-time error for display within the debug environment.

8. The computer program product of claim 7, the operation further comprising:

creating a log;

responsive to the first predefined run-time error of the plurality of predefined run-time errors occurring, updating a record of the first predefined run-time error in the log; and continuing to run the instrumented executable until the breakpoint is hit.

9. The computer program product of claim 7, the operation further comprising:

scanning parameters passed to a routine in the instrumented executable to detect the first predefined run-time error.

10. The computer program product of claim 7, the operation further comprising:

using data flow analysis to detect the plurality of predefined run-time errors defined by the plurality of analysis parameters in the instrumented executable by associating each detected predefined run-time error with a respective record in a debug log, wherein each record associates the detected predefined run-time error with a respective stack frame of a respective routine being executed when the respective predefined run-time error is detected.

11. The computer program product of claim 7, wherein a dynamic analysis tool instruments the executable with the additional executable program code to obtain program information about the executable.

* * * * *